US012753018B2

(12) United States Patent
Zhou et al.

(10) Patent No.: US 12,753,018 B2
(45) Date of Patent: Oct. 6, 2026

(54) DETECTION DEVICE AND OBJECT CONVEYING SYSTEM

(71) Applicants: Tyco Electronics (Zhuhai) Ltd, Zhuhai (CN); TE Connectivity Solutions GmbH, Schaffhausen (CH); Tyco Electronics (Shanghai) Co., Ltd., Shanghai (CN)

(72) Inventors: Lei (Alex) Zhou, Shanghai (CN); Wei Zheng, Zhuhai (CN); Hao Li, Zhuhai (CN); Dandan (Emily) Zhang, Shanghai (CN); Roberto Francisco-Yi Lu, Bellevue, WA (US); Ming (Micky) Jiang, Zhuhai (CN); Liqing (Mary) Ma, Zhuhai (CN)

(73) Assignees: TE Connectivity Solutions GmbH, Schaffhausen (CH); Tyco Electronics (Zhuhai) Ltd., Zhuhai (CN); Tyco Electronics (Shanghai) Co., Ltd., Shanghai (CN)

( * ) Notice: Subject to any disclaimer, the term of this patent is extended or adjusted under 35 U.S.C. 154(b) by 160 days.

(21) Appl. No.: 18/741,930

(22) Filed: Jun. 13, 2024

(65) Prior Publication Data

US 2024/0417184 A1 Dec. 19, 2024

(30) Foreign Application Priority Data

Jun. 13, 2023 (CN) ........................ 202310694705.7

(51) Int. Cl.
*B65G 43/08* (2006.01)

(52) U.S. Cl.
CPC ...... *B65G 43/08* (2013.01); *B65G 2203/0233* (2013.01); *B65G 2203/044* (2013.01)

(58) Field of Classification Search
CPC .............. B65G 43/08; B65G 2203/023; B65G 2203/044; B65G 2203/0233
See application file for complete search history.

(56) References Cited

U.S. PATENT DOCUMENTS

| | | | | |
|---|---|---|---|---|
| 11,767,176 B1 * | 9/2023 | Gomez | .................. | B65G 21/00 198/502.1 |
| 12,545,513 B1 * | 2/2026 | Day | ......................... | B65G 1/08 |

FOREIGN PATENT DOCUMENTS

| | | |
|---|---|---|
| DE | 102016111007 | * 12/2017 |
| JP | 1994160691 | * 6/1994 |
| JP | HO6160691 | * 6/1994 |

* cited by examiner

*Primary Examiner* — Gene O Crawford
*Assistant Examiner* — Lester III Rushin
(74) *Attorney, Agent, or Firm* — Barley Snyder

(57) ABSTRACT

A detection device includes an installation plate, a lever member rotatably installed on the installation plate and rotatable between a first position and a second position, and a sensor installed on the installation plate and detecting whether the lever member is in the second position. The lever member is rotated from the first position to the second position under a pushing of an object when the object is supplied to a predetermined workstation. The lever member can be automatically reset to the first position under gravity when no object is supplied to the predetermined workstation. It is determined that the object is supplied to the predetermined workstation if the sensor detects that the lever member is in the second position and, if the sensor does not detect that the lever member is in the second position, it is determined that no object is supplied to the predetermined workstation.

21 Claims, 5 Drawing Sheets

DETECTION DEVICE AND OBJECT CONVEYING SYSTEM

CROSS-REFERENCE TO RELATED APPLICATION

This application claims the benefit of the filing date under 35 U.S.C. § 119 (a)-(d) of Chinese Patent Application No. 202310694705.7, filed on Jun. 13, 2023.

FIELD OF THE INVENTION

The present invention relates to a detection device and an object conveying system comprising the detection device.

BACKGROUND OF THE INVENTION

Generally, before processing objects, they must be transported to a processing station. Therefore, it is necessary to set up detection equipment at the processing station to detect the presence of the objects to be processed. Visual inspection devices are usually used to detect the presence of the objects to be processed at the processing station. However, visual inspection devices have high costs and low detection efficiency due to the need for a large amount of image data processing.

SUMMARY OF THE INVENTION

A detection device includes an installation plate, a lever member rotatably installed on the installation plate and rotatable between a first position and a second position, and a sensor installed on the installation plate and detecting whether the lever member is in the second position. The lever member is rotated from the first position to the second position under a pushing of an object when the object is supplied to a predetermined workstation. The lever member can be automatically reset to the first position under gravity when no object is supplied to the predetermined workstation. It is determined that the object is supplied to the predetermined workstation if the sensor detects that the lever member is in the second position and, if the sensor does not detect that the lever member is in the second position, it is determined that no object is supplied to the predetermined workstation.

BRIEF DESCRIPTION OF THE DRAWINGS

Features and advantages of embodiments of the present disclosure will be apparent from the following description made in conjunction with the accompanying drawings, in which.

DETAILED DESCRIPTION

Figure 1:
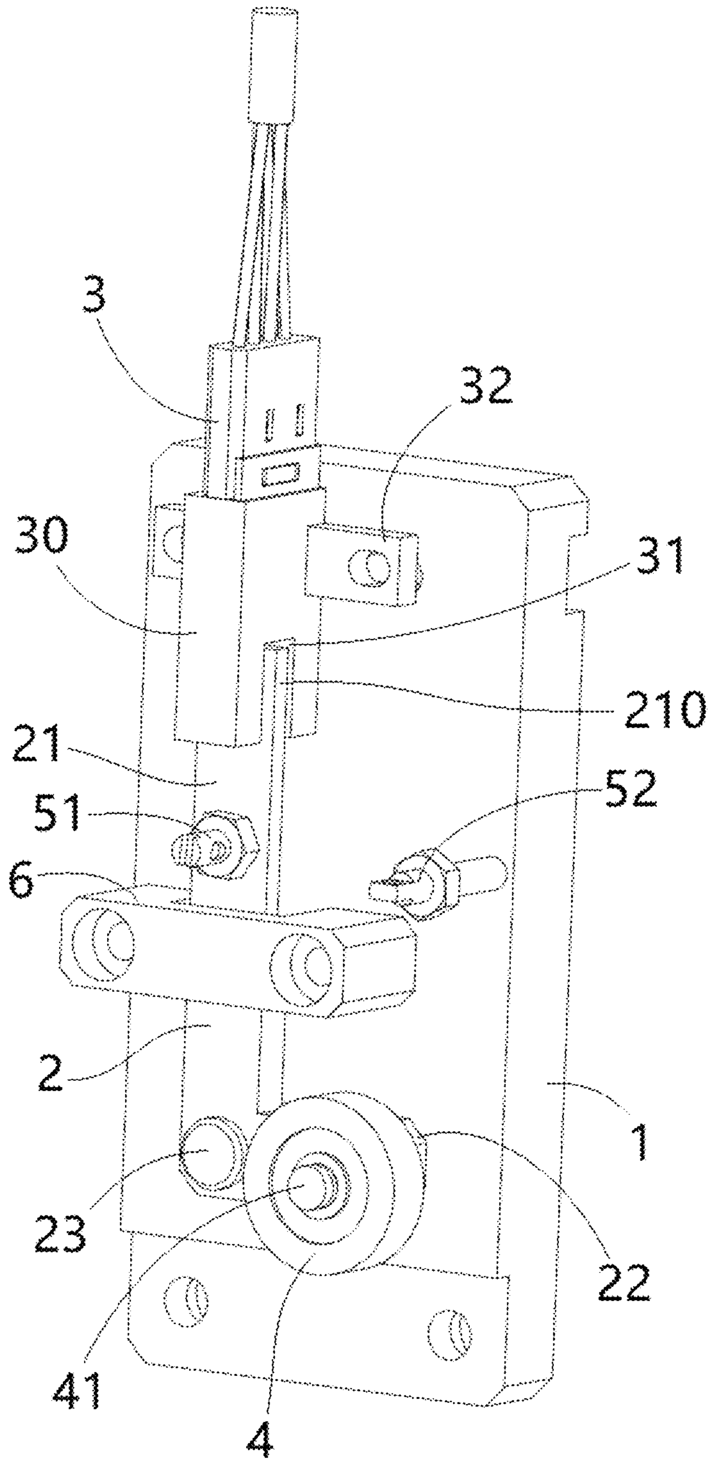
FIG. 1 shows an illustrative perspective view of a detection device according to an exemplary embodiment of the present invention when viewed from one direction.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
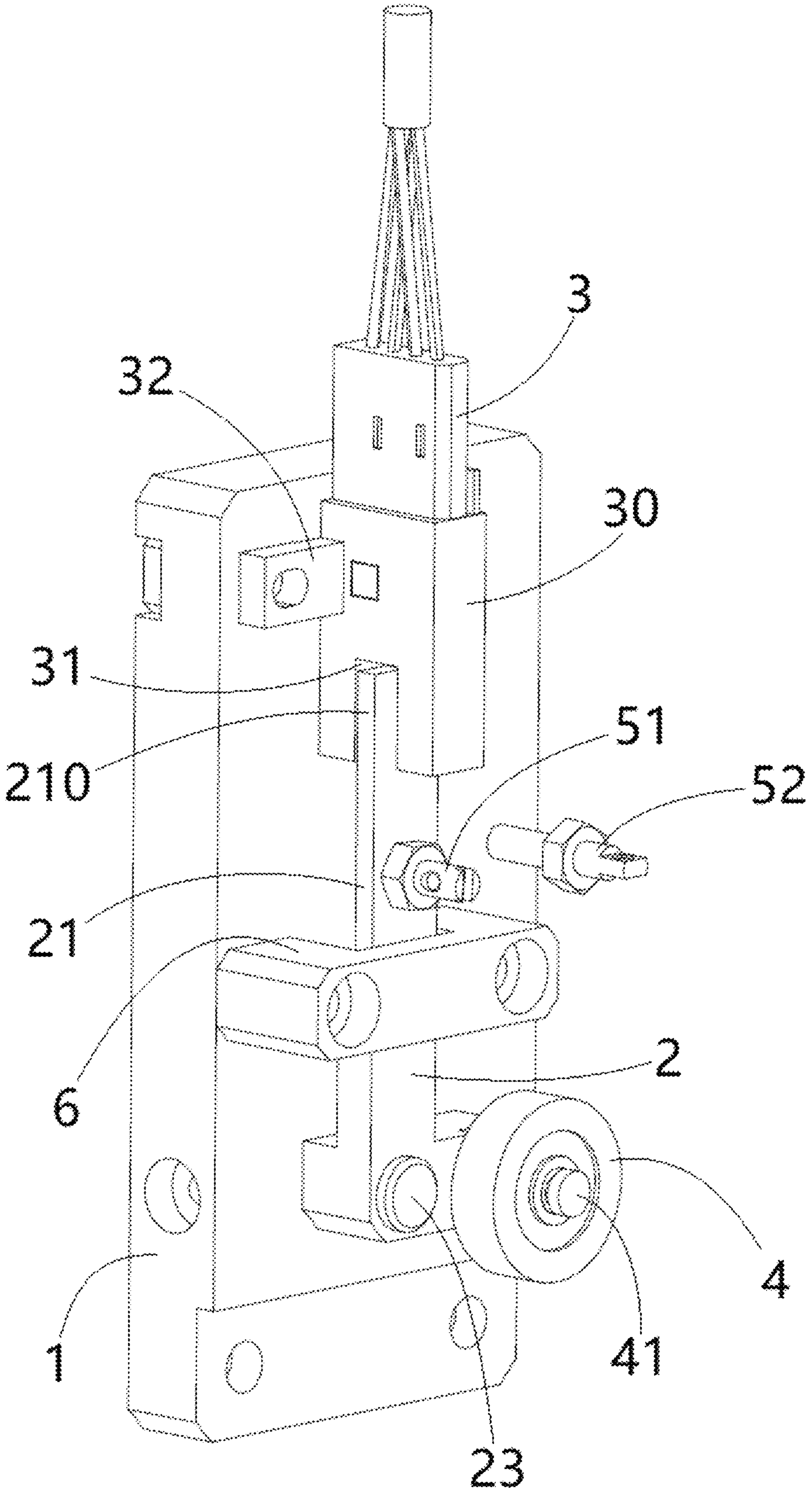
FIG. 2 shows an illustrative perspective view of a detection device according to an exemplary embodiment of the present invention when viewed from another direction.
Figure 3:
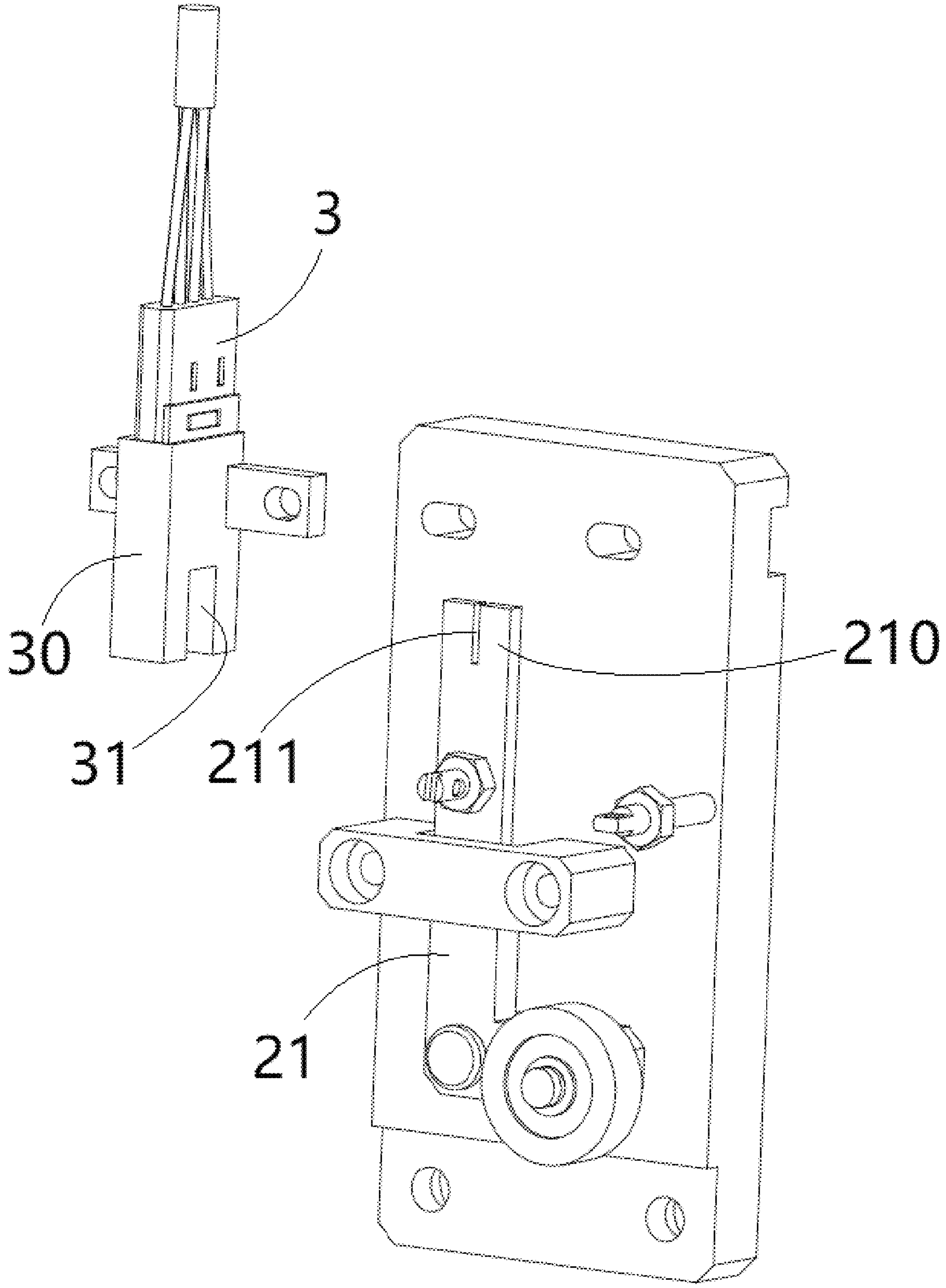
FIG. 3 shows an illustrative exploded view of a detection device according to an exemplary embodiment of the present invention.
Figure 4:
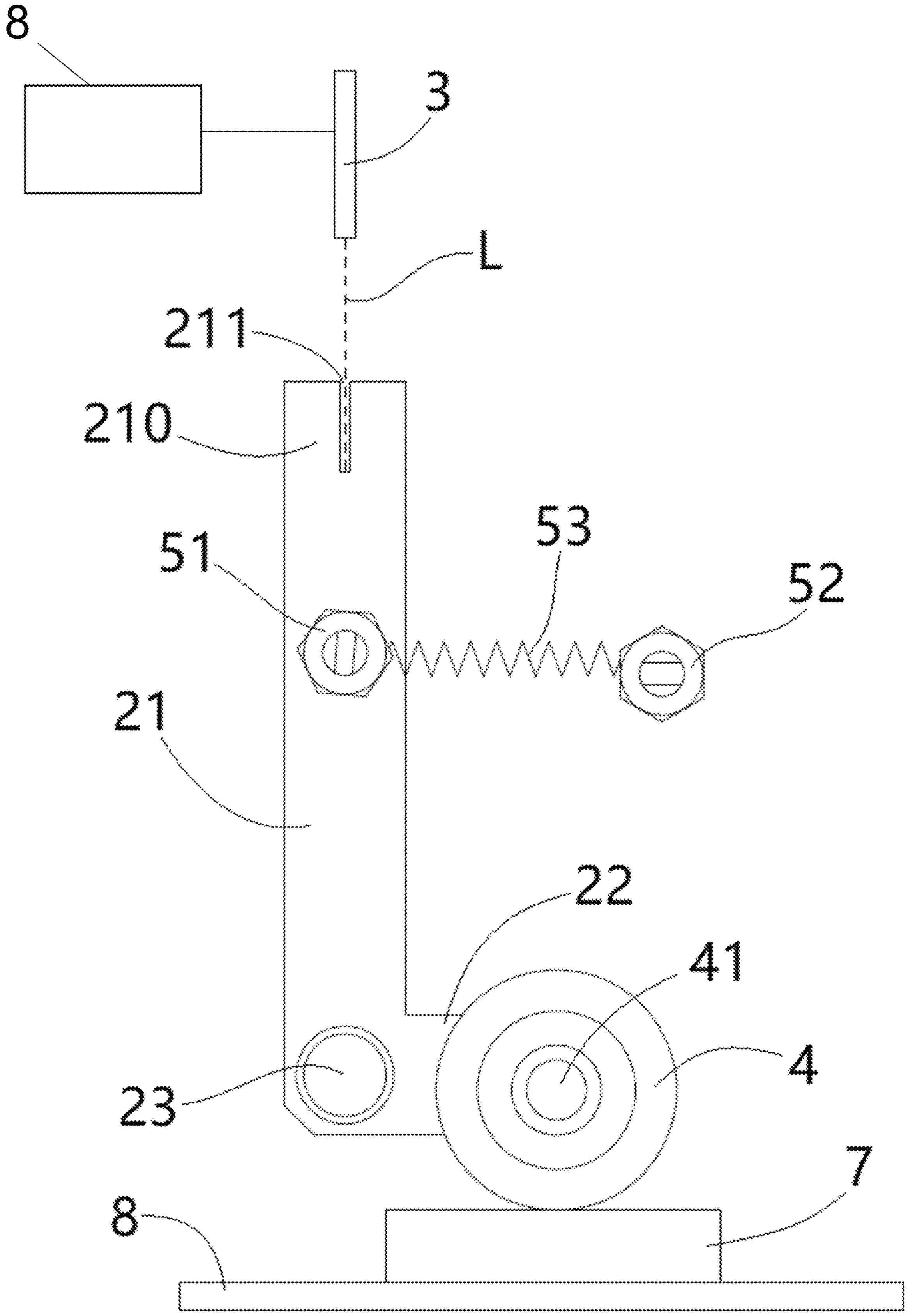
FIG. 4 shows an illustrative plan view of a detection device according to an exemplary embodiment of the present invention, in which the object has already been supplied to a predetermined workstation.
Figure 5:
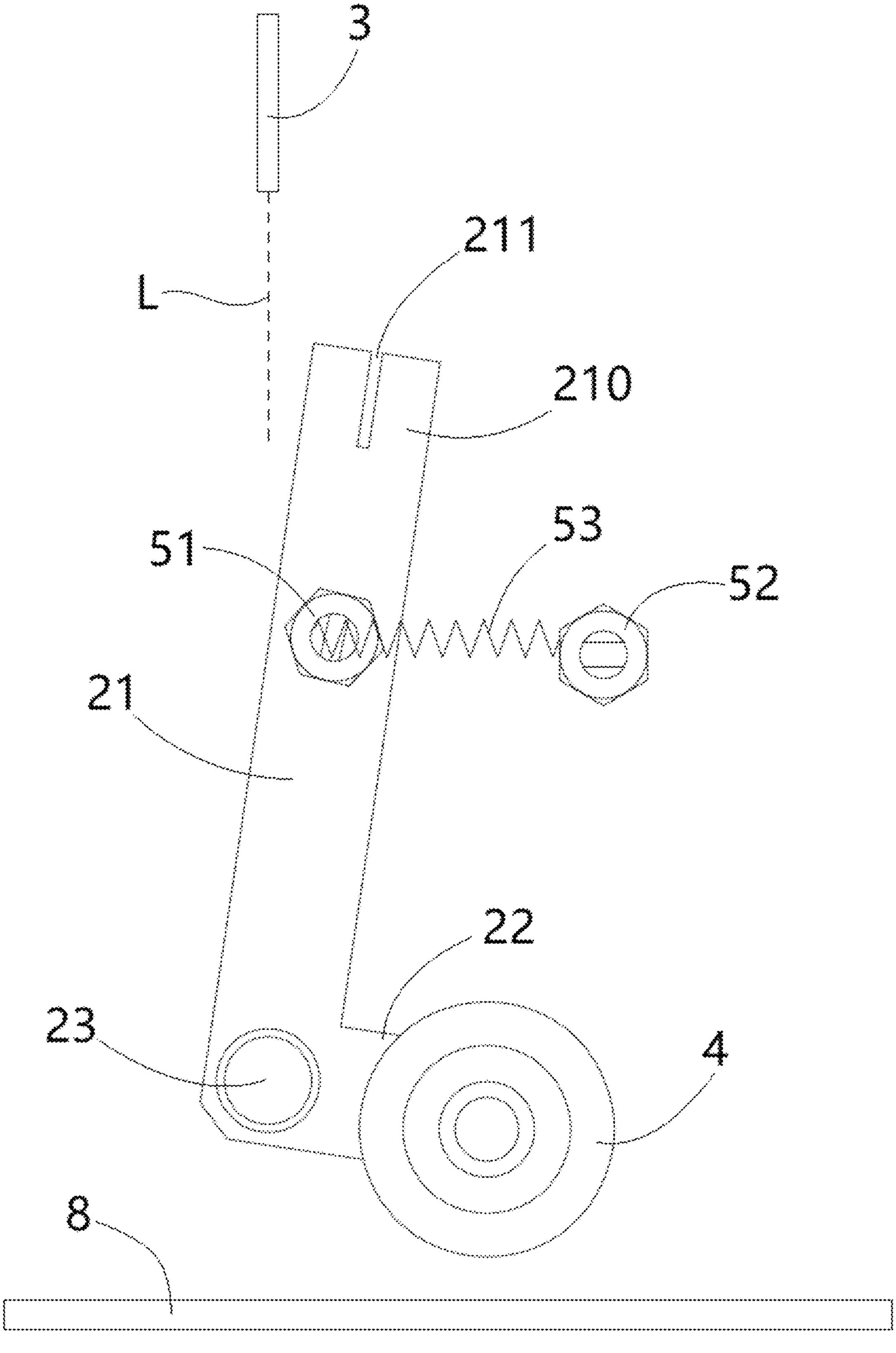
FIG. 5 shows an illustrative plan view of a detection device according to an exemplary embodiment of the present invention, in which no object is supplied to the predetermined workstation.

As shown in FIGS. 1 to 5, in an exemplary embodiment of the present invention, a detection device is disclosed. The detection device is used for detecting whether an object 7 is supplied to a predetermined workstation. The detection device includes: an installation plate 1, a lever member 2, and a sensor 3. The lever member 2 is rotatably installed on the installation plate 1 and adapted to rotate between a first position (as shown in FIG. 5) and a second position (as shown in FIG. 4). The sensor 3 is installed on installation plate 1 to detect whether the lever member 2 is in the second position.

As shown in FIGS. 4 to 5, in the illustrated embodiments, when the object 7 is supplied to the predetermined workstation, the lever member 2 is rotated from the first position to the second position under the pushing of the object 7. When no object 7 is supplied to the predetermined workstation, the lever member 2 can be automatically reset to the first position under the action of gravity. If the sensor 3 detects that the lever member 2 is in the second position, it is judged that the object 7 has been supplied to the predetermined workstation; otherwise, it is judged that no object 7 has been supplied to the predetermined workstation.

In the illustrated embodiment, when no object 7 is supplied to the predetermined workstation, the lever member 2 can be automatically reset to the first position under its own gravity.

As shown in FIGS. 1, 2, 4, and 5, in the illustrated embodiments, the detection device further comprises a roller 4, which is rotatably installed on the lever member 2. When the object 7 is supplied to the predetermined workstation, the object 7 contacts the roller 4 and pushes the lever member 2 from the first position to the second position through the roller 4. When no object 7 is supplied to the predetermined workstation, the lever member 2 can be automatically reset to the first position under the gravity of roller 4.

As shown in FIGS. 1 to 5, in the illustrated embodiments, the lever member 2 is L-shaped, including a first force arm 21 and a second force arm 22 perpendicularly connected to the first force arm 21. The roots of the first force arm 21 and the second force arm 22 are connected to each other and rotatably connected to the installation plate 1, allowing the lever member 2 to rotate between the first position and the second position.

In the illustrated embodiments, the roller 4 is rotatably connected to the end of the second force arm 22 of the lever member 2, allowing the roller 4 to freely rotate around its central axis when in contact with the object 7 to reduce friction between the two.

As shown in FIGS. 1, 2, and 4, in the illustrated embodiments, an installation shaft 41 is provided at the end of the second force arm 22, and an installation hole is formed in the roller 4 that matches the installation shaft 41, allowing the roller 4 to rotate freely around the installation shaft 41.

As shown in FIGS. 1, 2, 4, and 5, in the illustrated embodiments, a connection shaft 23 is provided on the installation plate 1, and a connection hole is formed in the roots of the first force arm 21 and the second force arm 22. The connection shaft 23 is rotatably fit with the connection hole, so that the lever member 2 can rotate around the connection shaft 23 between the first position and the second position.

In an embodiment, the detection device further includes a judgment device 8 shown in FIG. 4 (can be a software hardware combined functional module, such as a controller), which is connected to the sensor 3 in communication for determining whether the object 7 is supplied to a predetermined workstation based on the detection result of the sensor 3. If the sensor 3 detects that the lever member 2 is in the second position, the judgment device 8 determines that the object 7 has been supplied to the predetermined workstation, otherwise it determines that no object 7 has been supplied to the predetermined workstation.

As shown in FIGS. 3 to 5, in the illustrated embodiment, a slot 211 is formed in the end portion 210 of the first force arm 21, and the sensor 3 is a laser sensor. When the lever member 2 is in the second position, the laser beam L emitted by sensor 3 is aligned with the slot 211, and the slot 211 is detected by the sensor 3. If the sensor 3 detects the slot 211, it is determined that the object 7 has been supplied to the predetermined workstation; otherwise, it is determined that no object 7 has been supplied to the predetermined workstation.

The sensor 3 of the present invention, however, is not limited to the laser sensor shown in the diagram, but can also a switch sensor, such as a trigger switch. When the lever member 2 is in the second position, the trigger switch is pressed and triggered by the lever member 2, which can also detect the position of the lever member 2.

As shown in FIG. 4, when the lever member 2 is in the second position, the laser beam L emitted by the sensor 3 can be reflected back to the sensor 3 by the bottom surface of slot 211, and the slot 211 is detected by the sensor 3. As shown in FIG. 5, when the lever member 2 is not in the second position, the laser beam L emitted by sensor 3 is not aligned with slot 211, so that the laser beam L cannot be reflected back to the sensor 3 by the bottom surface of slot 211, and therefore slot 211 cannot be detected. When the sensor 3 does not detect the slot 211, it is determined that lever member 2 is not in the second position. When the lever member 2 is in the second position shown in FIG. 4, the first lever arm 21 and the slot 211 extend along a vertical direction, and the second lever arm 22 extends along a horizontal direction.

As shown in FIGS. 1 to 3, in the illustrated embodiments, a receiving slot 31 is formed in the housing 30 of the sensor 3, and the end portion 210 of the first force arm 21 is accommodated in the receiving slot 31 to prevent the laser beam L emitted by the sensor 3 from being interfered by external light. A connecting car 32 is formed on the housing 30 of the sensor 3, which is fixed to the installation plate 1 to secure the sensor 3 to the installation plate 1.

In an embodiment, the sensor 3 may be a fiber optic distance sensor. When the distance detected by the sensor 3 is equal to the distance between the sensor 3 and the bottom surface of slot 211, it is determined that lever member 2 is in the second position. If the sensor 3 detects the slot 211, the aforementioned judgment device can determine that the object 7 is supplied to the predetermined workstation, otherwise it is determined that no object 7 is supplied to the predetermined workstation.

As shown in FIGS. 1 and 2, in the illustrated embodiments, the detection device further comprises a limiting member 6, which is installed on the installation plate 1. When the lever member 2 is reset to the first position, the limit member 6 is pressed against the first lever arm 21 of the lever member 2 to limit the lever member 2 at the first position.

As shown in FIGS. 4 and 5, in the illustrated embodiments, the detection device further comprises an elastic element 53, such as a spring or elastic rope. The elastic element 53 is connected between the first force arm 21 of the lever member 2 and the installation plate 1. The clastic element 53 is used to apply an auxiliary resetting force to the lever member 2, so that the lever member 2 can be reset to the first position under the action of the auxiliary resetting force. In this way, the lever member 2 can be reliably reset to the first position.

As shown in FIGS. 1, 2, 4, and 5, in the illustrated embodiments, a first connecting post 51 is provided on the first force arm 21 of the lever member 2, a second connecting post 52 is provided on the installation plate 1, and the elastic element 53 is connected between the first connecting post 51 and the second connecting post 52.

In the aforementioned exemplary embodiments of the present invention, the detection device can directly determine whether the object is supplied to the predetermined workstation based on the position of the lever member. Therefore, the present invention does not require the use of expensive visual devices, reduces detection costs, and can also improve detection efficiency.

In another exemplary embodiment of the present invention, an object conveying system is also disclosed. The object conveying system includes: an object conveying device 8 and the aforementioned detection device. The object conveying device 8 is used to transport the object 7 to a predetermined workstation. The detection device is installed at the predetermined workstation to detect whether the object 7 has been transported to the predetermined workstation.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A detection device for detecting whether an object is supplied to a predetermined workstation, comprising:

an installation plate;

a lever member rotatably installed on the installation plate and rotatable between a first position and a second position;

a sensor installed on the installation plate and detecting whether the lever member is in the second position, the lever member is rotated from the first position to the second position under a pushing of the object when the object is supplied to the predetermined workstation, the lever member can be automatically reset to the first position under gravity when no object is supplied to the predetermined workstation; and a judgment device connected to the sensor and adapted to determine whether the object is supplied to the predetermined workstation based on a detection result of the sensor, it is determined by the judgment device that the object is supplied to the predetermined workstation if the sensor detects that the lever member is in the second position and, if the sensor does not detect that the lever member is in the second position, it is determined by the judgment device that no object is supplied to the predetermined workstation.

2. The detection device according to claim 1, further comprising a roller rotatably installed on the lever member, the object comes into contact with the roller and pushes the lever member from the first position to the second position through the roller when the object is supplied to the predetermined workstation.

3. The detection device according to claim 2, wherein the lever member is L-shaped and has a first force arm and a second force arm perpendicularly connected to the first force arm, the first force arm and the second force arm are connected to each other and rotatably connected to the installation plate.

4. The detection device according to claim 3, wherein the roller is rotatably connected to an end of the second force arm.

5. The detection device according to claim 4, wherein an installation shaft is provided at the end of the second force arm and an installation hole is formed in the roller, the installation shaft is rotatably fit with the installation hole.

6. The detection device according to claim 3, wherein a connection shaft is provided on the installation plate, a connection hole is formed on the first force arm and the second force arm, the connection shaft is rotatably fit with the connection hole.

7. The detection device according to claim 3, wherein a slot is formed in an end portion of the first force arm, the sensor is a laser sensor, a laser beam emitted by the sensor is aligned with the slot to detect the slot when the lever member is in the second position.

8. The detection device according to claim 7, wherein the laser beam emitted by the sensor is reflected back to the sensor by a bottom surface of the slot when the lever member is in the second position.

9. The detection device according to claim 8, wherein the laser beam cannot be reflected back to the sensor and the sensor does not detect the slot when the lever member is not in the second position, the sensor determines whether the lever member is in the second position or not in the second position by detection of the slot.

10. The detection device according to claim 7, wherein the first lever arm and the slot extend along a vertical direction and the second lever arm extends in a horizontal direction when the lever member is in the second position.

11. The detection device according to claim 7, wherein the end portion of the first force arm is received in a receiving slot of a housing of the sensor to prevent the laser beam emitted by the sensor from external light interference.

12. The detection device according to claim 11, wherein the housing of the sensor has a connecting ear fixed to the installation plate.

13. The detection device according to claim 7, wherein the sensor is a fiber optic distance sensor.

14. The detection device according to claim 13, wherein when a distance detected by the sensor is equal to a distance between the sensor and a bottom surface of the slot, it is determined that the lever member is in the second position.

15. The detection device according to claim 7, further comprising a limiting member installed on the installation plate, the limiting member is pressed against the first force arm of the lever member to limit the lever member at the first position when the lever member is reset to the first position.

16. The detection device according to claim 7, further comprising a judgment device connected to the sensor and determining whether the object is supplied to the predetermined workstation based on a detection result of the sensor, the judgment device determines that the object is supplied to the predetermined workstation if the sensor detects the slot and otherwise it determines that no object is supplied to the predetermined workstation.

17. The detection device according to claim 3, further comprising an elastic element connected between the first force arm of the lever member and the installation plate to apply an auxiliary resetting force to the lever member resetting the lever member to the first position.

18. The detection device according to claim 17, wherein a first connecting post is provided on the first force arm of the lever member and a second connecting post is provided on the installation plate, the elastic element is connected between the first connecting post and the second connecting post.

19. An object conveying system, comprising:

an object conveying device used to transport an object to a predetermined workstation; and a detection device installed at the predetermined workstation, the detection device detects whether the object is transported to the predetermined workstation, the detection device includes an installation plate, a lever member rotatably installed on the installation plate and rotatable between a first position and a second position, and a sensor installed on the installation plate and detecting whether the lever member is in the second position, the lever member is rotated from the first position to the second position under a pushing of the object when the object is supplied to the predetermined workstation, the lever member can be automatically reset to the first position under gravity when no object is supplied to the predetermined workstation, it is determined by a judgment device connected to the sensor that the object is supplied to the predetermined workstation if the sensor detects that the lever member is in the second position and, if the sensor does not detect that the lever member is in the second position, it is determined that no object is supplied to the predetermined workstation.

20. A detection device for detecting whether an object is supplied to a predetermined workstation, comprising:

an installation member;

a lever member rotatably installed on the installation member and rotatable between a first position and a second position;

a sensor installed on the installation member and adapted to detect whether the lever member is in the second position, the lever member is adapted to be biased from the first position to the second position by the object when the object is supplied to the predetermined workstation; and a controller operatively connected to the sensor and adapted to:

determine that the object is supplied to the predetermined workstation if the sensor detects that the lever member is in the second position; or determine that no object is supplied to the predetermined workstation if the sensor does not detect that the lever member is in the second position.

21. The detection device according to claim 20, wherein:

an opening is formed in the lever;

the sensor is a laser sensor; and a laser beam emitted by the sensor is aligned with the opening to detect the opening when the lever member is in the second position.

* * * * *